United States Patent [19]

Tucker

[11] Patent Number: 4,972,621
[45] Date of Patent: Nov. 27, 1990

[54] FISHING ROD SUPPORT

[76] Inventor: Mark O. Tucker, 2548 N. Shelton, Wichita, Kans. 67204

[21] Appl. No.: 379,100

[22] Filed: Jul. 13, 1989

[51] Int. Cl.⁵ .................. A01K 97/10; A01K 87/00
[52] U.S. Cl. .................................... 43/21.2; 248/533
[58] Field of Search .................. 43/1, 15, 18.1, 21.2, 43/25, 15; 248/157, 166, 170, 439, 172, 173, 178, 188.6, 231.4, 216.4, 216.6, 532, 533

[56] References Cited

U.S. PATENT DOCUMENTS

| | | | |
|---|---|---|---|
| 1,091,491 | 3/1914 | Ebur | 43/21.2 |
| 2,204,692 | 10/1937 | Parisio | 43/21.2 |
| 2,311,823 | 9/1941 | Gaskill | 43/21.2 |
| 2,317,445 | 9/1941 | Davidson | 43/21.2 |
| 2,438,388 | 3/1948 | Polk | 248/533 |
| 2,459,549 | 1/1949 | Smith . | |
| 2,526,981 | 10/1950 | Von Beck . | |
| 2,539,080 | 1/1951 | Hoover . | |
| 2,703,465 | 3/1955 | DiStefano | 43/15 |
| 2,804,277 | 8/1957 | Kinder | 43/21.2 |
| 3,453,765 | 7/1969 | Gibbons | 43/21.2 |
| 3,530,611 | 12/1968 | Britt | 43/21.2 |
| 3,906,653 | 9/1975 | Williams . | |
| 4,133,131 | 1/1979 | Davy | 43/26 |
| 4,261,128 | 4/1981 | Dobbins | 43/21.2 |

Primary Examiner—Kurt Rowan

[57] ABSTRACT

A mechanism for supporting a fishing rod in an inclined upright position suitable for attracting (catching) fish. The mechanism includes a balancing post that can assume an operating position contacting the ground surface or a storage position extending along the undersurface of the fishing rod.

2 Claims, 1 Drawing Sheet

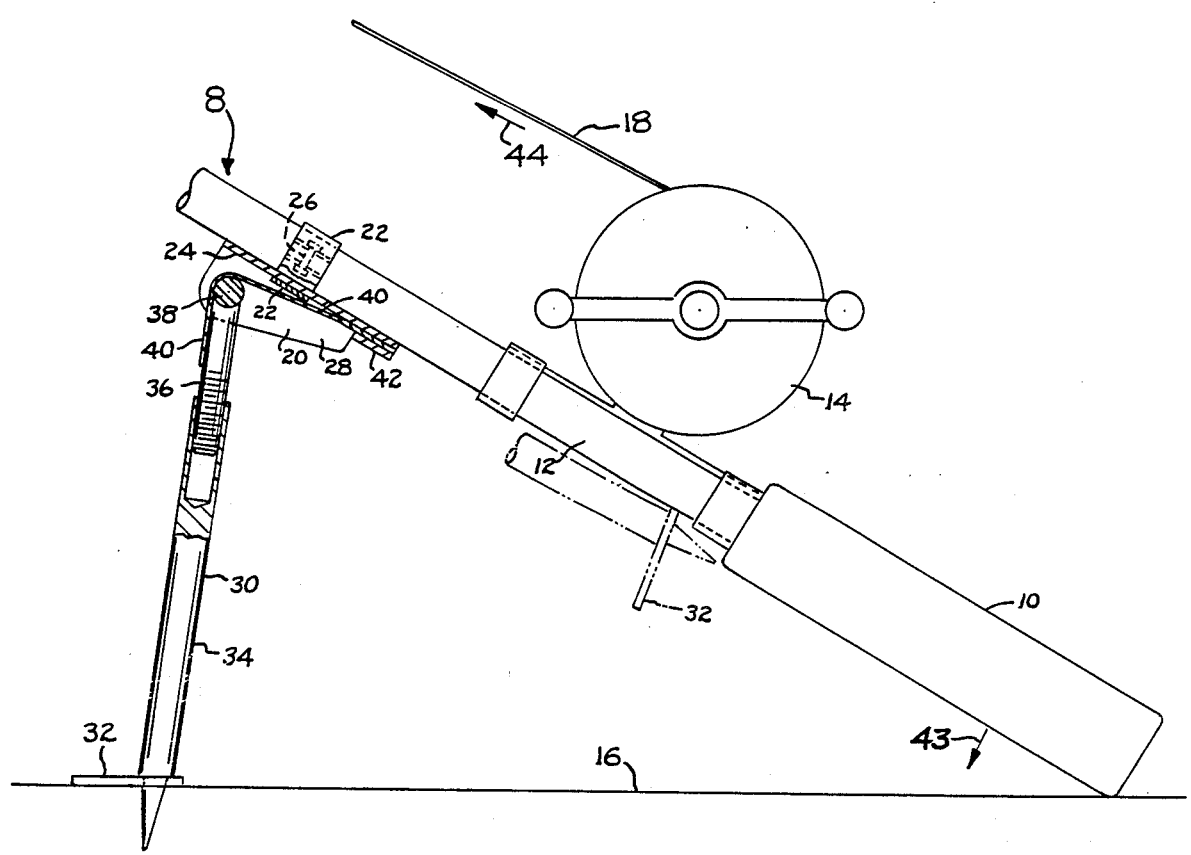

FISHING ROD SUPPORT

BACKGROUND AND SUMMARY OF THE INVENTION

This invention relates to a mechanism for supporting a fishing rod in an inclined upright position suitable for catching fish. The mechanism has some general similarities to mechanisms shown in U.S. Pat. No. 2,459,549 to J. Smith, U.S. Pat. No. 2,526,981 to G. Von Beck, U.S. Pat. No. 2,539,080 to B. Hoover, and U.S. Pat. No. 3,906,653 to C. Williams.

My improved mechanism comprises a bracket structure attachable to a fishing rod at a point above the reel-support section of the rod. A balancing post is swingably connected to the bracket to normally assume a generally vertical position extending downwardly to the ground surface; the end of the fishing rod handle will then rest on the ground surface several inches behind the balancing post, with the fishing rod taking an inclined upright position.

A spring is trained between the bracket and the balancing post so that when the fishing rod is picked up (e.g. when a fish strikes the bait) the balancing post automatically folds up against the undersurface of the reel-support section without reaching the handle. The fisherman can grab onto the handle without having to extend his fingers around the balancing post.

THE DRAWINGS

The single Fig. is a side elevational view of a conventional fishing rod, with a support mechanism of this invention attached thereto. Some parts of the mechanism are shown in section.

DESCRIPTION OF A PREFERRED EMBODIMENT OF THE INVENTION

The drawing shows a conventional fishing rod 8 having a handle 10 and a reel-support section 12 adjacent thereto. A conventional reel 14 is mounted on section 12 of the rod. The fishing rod is shown in an inclined upright position suitable for catching (or at least attracting) fish. Handle 10 is shown resting on ground surface 16. A fishing line 18 extends upwardly from reel 14 to the outer tip end of rod 8 and thence downwardly into the water.

My invention relates to a mechanism for supporting the fishing rod in an inclined upright position, as shown in the drawing. The support mechanism includes a channel-like bracket 20 detachably fastened to the undersurface of the fishing rod at a point above the reel-support section 12. Any suitable means may be used to attach bracket 20 to rod 8. As shown in the drawing, the attaching means comprises a split collar 22 extending through slot-like openings in flanges 28 of channel element 20. Collar 22 encircles rod 8 so as to hold web wall 24 of channel element 20 against the rod 8 undersurface. A nut-bolt means 26 is associated with flanges on collar 22, to thus clamp the collar around rod 8.

A balancing post 30 is pivotably connected to bracket 20, to normally assume a position extending downwardly from the fishing rod into contact with ground surface 16. The extreme lower end of post 30 may be pointed to dig (grab) into the ground surface. Also, a foot plate 32 may be carried on the post to have firm areawide contact with the ground surface. If the balancing post is to be used on a hard surface or non-horizontal surface, post 30 can have a different lower end configuration, as shown e.g. in U.S. Pat. No. 3,906,653 to C. Williams.

Post 30 is preferably comprised of two adjustably-connected post elements 34 and 36. Element 34 is an internally threaded sleeve, whereas element 36 is an externally threaded screw. The two elements may be screwed (turned) to adjust the overall length of the post, so as to change the inclination angle of the fishing rod.

A transverse shaft 38 is attached to the upper end of screw 36 so as to extend through circular openings in flanges 28 of bracket 20, thereby pivotably connecting post 30 to bracket 20. The post can be folded to a position against the undersurface of reel-support section 12, as shown in dashed lines. The length of the post is such that it will not reach handle 10; therefore the handle can be manually grasped without contact between the person's fingers and post 30.

A leaf spring 40 is trained between bracket 20 and post 30 so as to urge the post toward its folded-up position (shown in dashed lines). Spring 40 has one end anchored to bracket 20, e.g. by means of tabs 42 struck out of flange walls 28. The spring extends along web wall 24, partially around pivot shaft 38, and thence downwardly along screw 36 to exert a force in a direction that will tend to cause post 30 to move to its folded position.

Spring 40 is a comparatively light spring, such that post 30 can be moved to the illustrated operative position without adversely affecting the rod-support action of the mechanism. Spring 40 tends to exert a downward biasing force on handle 10, as shown by arrow 43 in the drawing; the spring thus keeps the fishing rod in an upright position.

Should a fish strike the bait there will be a tugging force on line 18, as indicated by arrow 44 in the drawing. If the rod is balanced relative to pivot 38 the rod may swing slightly to a less inclined position, with the end of handle 10 raising slightly away from the ground surface. Also, the tip end of the fishing rod may bend. These various motions can help to keep the fish on the line, while alerting the fisherman to the fact that a fish has struck the bait.

The fisherman can lift the fishing rod from its supported position by grasping handle 10. Balancing post 30 will automatically swing to its folded position without offering interference to manual manipulation of the fishing rod.

The drawing shows one form that the invention can take. Other forms are possible.

I claim:

1. A fishing rod and mechanism for supporting said rod in an inclined upright position suitable for catching fish; said fishing rod comprising an elongated handle (10) and a reel-support section (12) adjacent thereto; said support mechanism comprising a bracket (20); means (22) removably attaching the bracket to the rod at a point above the reel-support section and remote from the handle; a balancing post (30); means (38) pivotably connecting said balancing post to the bracket so that the post can assume a position extending downwardly from the fishing rod to the ground surface, with the end of the fishing rod handle resting on the ground surface; and spring means (40) extending between the bracket and the balancing post (30) for biasing the fishing rod toward an inclined upright position engaged with the ground surface, whereby when a fish strikes, the rod can swing around said pivot means (38) against the force of the spring means; said pivot means (38) being spaced from the elongated handle (10) by a distance that is greater than the distance from the pivot means to the ground-engagement end of the balancing post, so that when the fishing rod is lifted from the ground surface the balancing post automatically folds up against the undersurface of the reel-support section without reaching the handle; the fishing rod being adapted to being picked up and manually gripped around the elongated handled without removal of the support mechanism from the rod or interference by the support mechanism to manual grimpment of the handle; said bracket extending only a limited distance along the fishing rod so that the space between said bracket and said handle (10) is unobstructed and therefore capable of accommodating the balancing post in its folded condition.

2. The fishing rod and support mechanism of claim 1, wherein said bracket (20) comprises a channel element having a web wall (24) positionable against an undersurface of the fishing rod, and two flanges (28) extending downwardly away from the fishing rod; said pivot means comprising a pivot shaft (38) extending transversely from one end of the balancing post through the bracket flanges; said balancing post having a portion thereof adapted to swing into the space between the bracket flanges so that the post can extend closely alongside the undersurface of the fishing rod when the post is in the folded condition; said balancing post comprising two aligned adjustably connected post elements that can be adjusted to change the overall length of the post.

* * * * *